(12) United States Patent
Brown et al.

(10) Patent No.: US 8,619,140 B2
(45) Date of Patent: Dec. 31, 2013

(54) AUTOMATIC ADJUSTMENT OF AREA MONITORING BASED ON CAMERA MOTION

(75) Inventors: Lisa M. Brown, Pleasantville, NY (US); Jonathan H. Connell, II, Cortlandt-Manor, NY (US); Arun Hampapur, Norwalk, CT (US); Andrew W. Senior, New York, NY (US); Chiao-Fe Shu, Scarsdale, NY (US); Ying-Li Tian, Yorktown Height, NY (US)

(73) Assignee: International Business Machines Corporation, Armonk, NY (US)

( * ) Notice: Subject to any disclaimer, the term of this patent is extended or adjusted under 35 U.S.C. 154(b) by 1664 days.

(21) Appl. No.: 11/830,093

(22) Filed: Jul. 30, 2007

(65) Prior Publication Data

US 2009/0033746 A1 Feb. 5, 2009

(51) Int. Cl.
*H04N 7/18* (2006.01)
(52) U.S. Cl.
USPC .......................................... 348/155; 348/154
(58) Field of Classification Search
USPC ................................. 348/148, 155, 169, 154
See application file for complete search history.

(56) References Cited

U.S. PATENT DOCUMENTS

| 6,100,925 | A | 8/2000 | Rosser et al. |
| 6,359,647 | B1 * | 3/2002 | Sengupta et al. ............. 348/154 |
| 6,696,945 | B1 | 2/2004 | Venetianer et al. |
| 6,816,073 | B2 * | 11/2004 | Vaccaro et al. ............... 340/541 |
| 6,970,591 | B1 | 11/2005 | Lyons et al. |
| 7,139,411 | B2 | 11/2006 | Fujimura et al. |
| 7,154,540 | B2 | 12/2006 | Honey et al. |
| 7,664,292 | B2 * | 2/2010 | van den Bergen et al. ... 382/103 |
| 2006/0126738 | A1 | 6/2006 | Boice et al. |
| 2006/0203090 | A1 | 9/2006 | Wang et al. |
| 2006/0279630 | A1 | 12/2006 | Aggarwal et al. |

* cited by examiner

*Primary Examiner* — David X Yi
(74) *Attorney, Agent, or Firm* — Matthew Chung; Hoffman Warnick LLC

(57) ABSTRACT

A solution for monitoring an area while accounting for camera motion and/or monitoring tasks is provided. For example, a physical area corresponding to a new field of view can be estimated for a camera for which motion is detected. The physical area can be estimated using a set of reference images previously captured by the camera, each of which comprises a unique field of view previously captured by the camera. Based on the physical area, a status for a monitoring task of the camera (e.g., an alert) can be updated and/or a location of an area for the monitoring task within an image captured by the camera can be updated. Further, based on the update(s), a field of view for a second camera can be automatically adjusted and/or a status for the monitoring task on the second camera can be automatically updated.

25 Claims, 12 Drawing Sheets

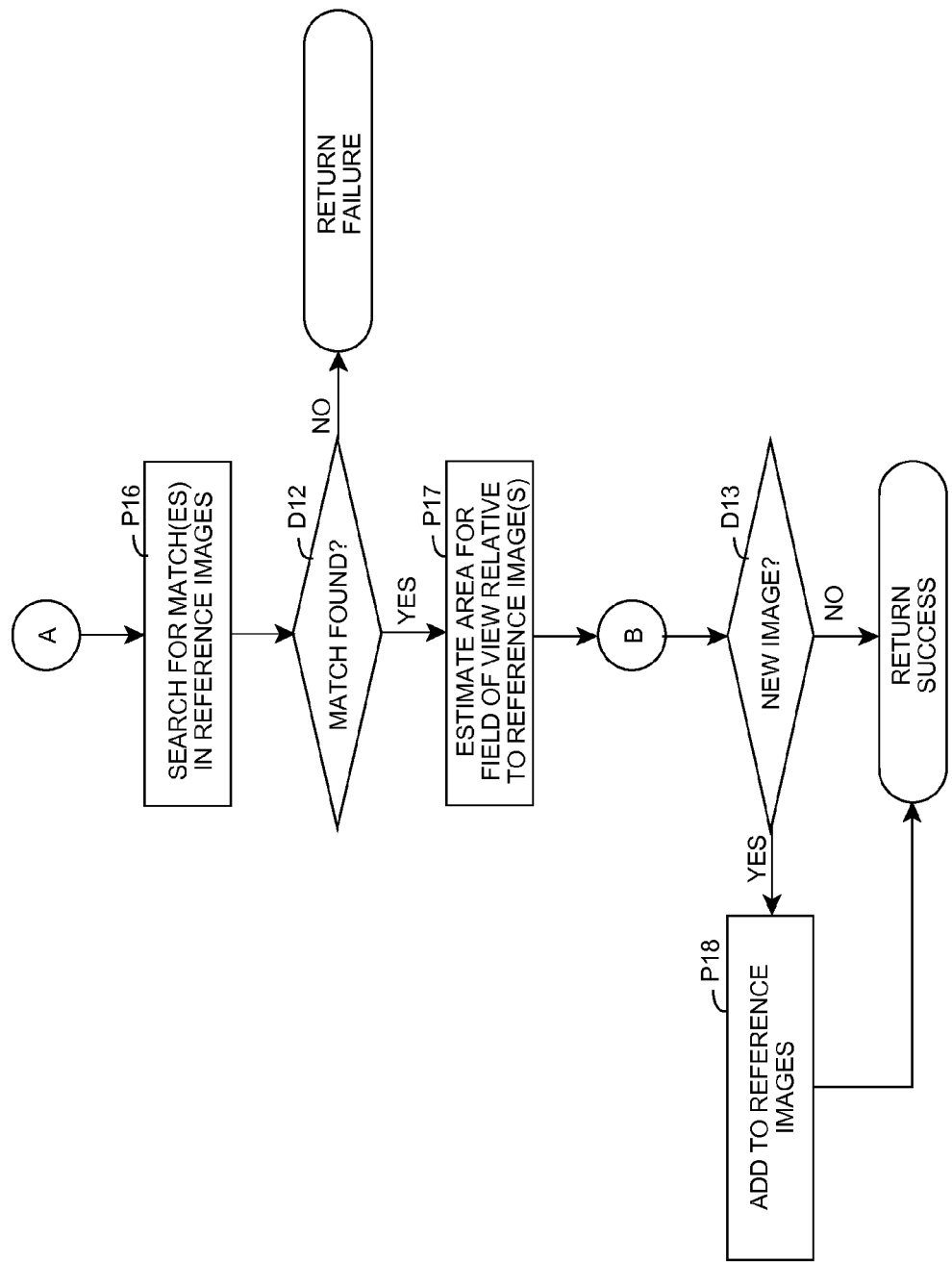

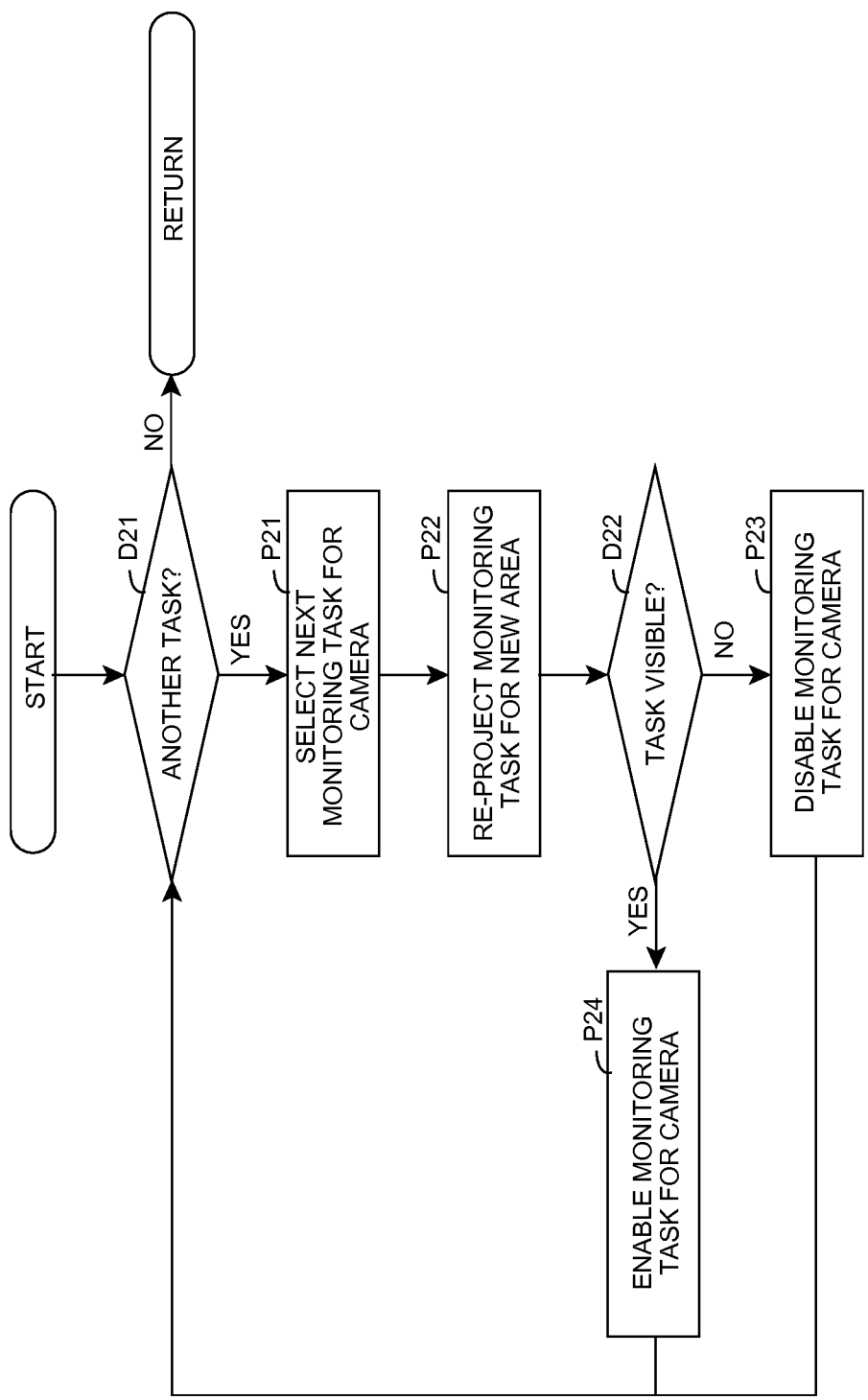

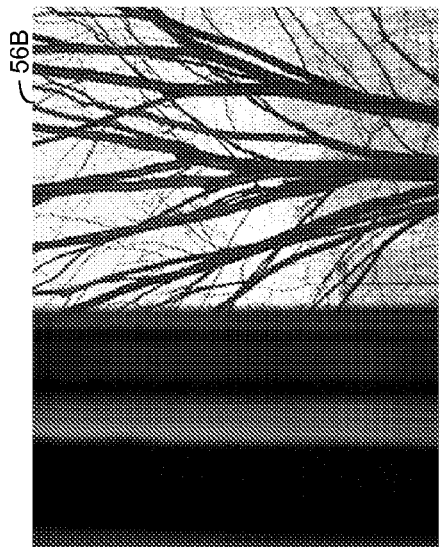

| TASK | TASK PRIORITY | CAMERA | CAMERA PRIORITY | FIELD OF VIEW |
|---|---|---|---|---|
| TASK A | PRIORITY 1 | CAMERA X | CAMPRI 1 | FOV A |
| TASK A | PRIORITY 1 | CAMERA Z | CAMPRI 2 | FOV B |
| TASK B | PRIORITY 2 | CAMERA Z | CAMPRI 1 | FOV C |
| TASK B | PRIORITY 2 | CAMERA Y | CAMPRI 2 | FOV D |
| TASK B | PRIORITY 2 | CAMERA X | CAMPRI 3 | FOV E |
| TASK C | PRIORITY 3 | CAMERA Y | CAMPRI 1 | FOV F |

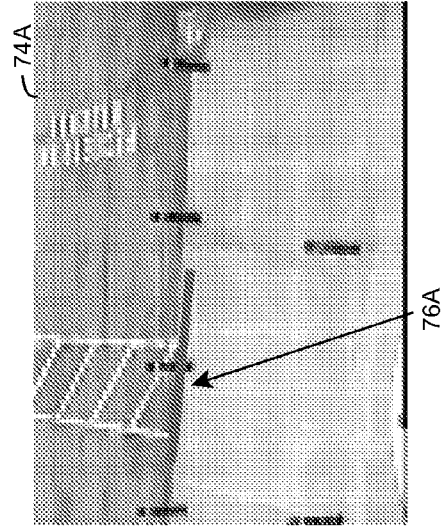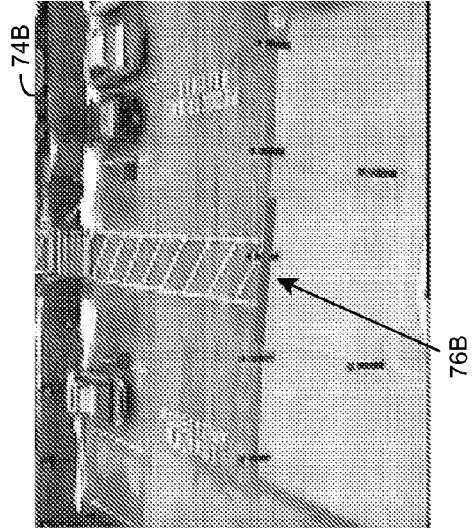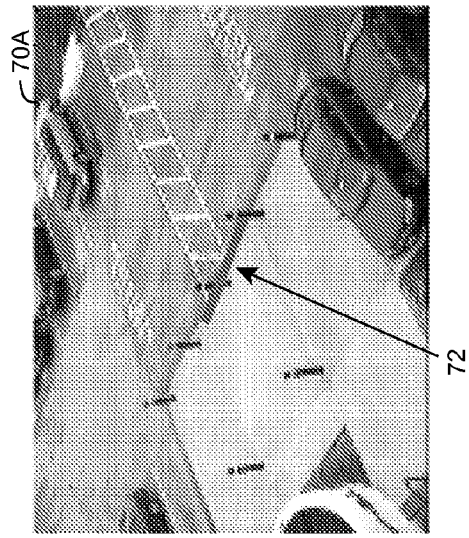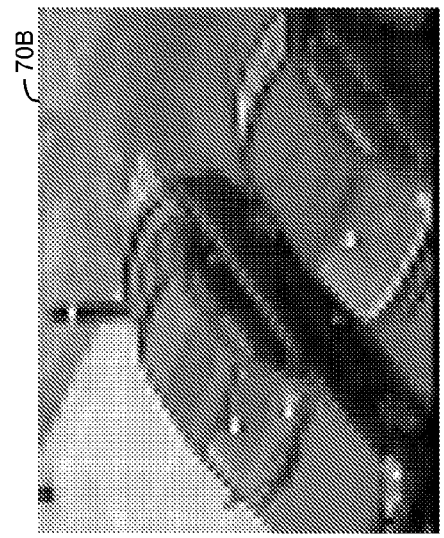

AUTOMATIC ADJUSTMENT OF AREA MONITORING BASED ON CAMERA MOTION

TECHNICAL FIELD OF THE INVENTION

Aspects of the invention relate generally to video-based monitoring, and more particularly, to accommodating movement of a video camera while performing video-based monitoring.

BACKGROUND OF THE INVENTION

Currently, in many surveillance applications, such as store loss prevention or site security, a human operator relies on pan-tilt-zoom cameras to monitor a wide area with relatively few cameras. Because of the tedious nature of video monitoring, some approaches seek to automate some or all of the monitoring. For example, some approaches can generate an alert when a predefined event, such as motion in a region or movement of an object into a region (e.g., crossing over a tripwire), is detected in a video stream.

Typically, the alert is defined using image coordinates of a camera, e.g., by defining a region of interest within images acquired by the camera or by defining a line (e.g., tripwire) in the acquired images. However, such a definition does not accommodate a change in the physical location captured in the acquired images, e.g., by movement of the camera. As a result, an alert may not be triggered and/or false alerts may be triggered when the field of view of the camera is altered.

In some surveillance approaches, multiple cameras are used together to track an individual and/or other object. In one approach, a hierarchical approach is used in which a single stationary camera monitors a large area, while dynamic cameras are used to obtain clear images of areas/objects of interest. In another approach, the tracking of an object within the field of view of one camera is used to send adjustments to another camera for which the object is expected to enter its field of view.

In other video applications, such as broadcasting video of sporting events, a physical location, such as a region in which an advertisement is inserted into the video or an indication of a first down on a football field, is tracked as a video camera is moved to follow action on the field. In these applications, a region is defined by one or more landmarks in advance of tracking the region in real time. Further, the region can comprise a unique color to assist with its tracking and/or determining whether any occlusions may be present. Still further, camera sensor data (e.g., pan, tilt, zoom) has been used to assist in locating the region in video.

SUMMARY OF THE INVENTION

Aspects of the invention provide a solution for monitoring an area while accounting for camera motion and/or monitoring tasks. For example, a physical area corresponding to a new field of view can be estimated for a camera for which motion is detected. The physical area can be estimated using a set of reference images previously captured by the camera, each of which comprises a unique field of view previously captured by the camera. Based on the physical area, a status for a monitoring task of the camera (e.g., an alert) can be updated and/or a location of an area for the monitoring task within an image captured by the camera can be updated. Further, based on the update(s), a field of view for a second camera can be automatically adjusted and/or a status for the monitoring task on the second camera can be automatically updated. In this manner, a solution is provided that can account for camera movement that may result in a change to the image used to perform a monitoring task and/or result in the monitoring task no longer being able to be performed by a camera.

A first aspect of the invention provides a method of monitoring an area, the method comprising: detecting motion of a camera monitoring the area; estimating a physical area corresponding to a new field of view for the camera; updating, using the physical area, at least one of: a status for a monitoring task of the camera or a location of an area for the monitoring task within an image captured by the camera; and automatically performing, based on the updating, at least one of: adjusting a field of view of a second camera monitoring the area or updating a status for the monitoring task on the second camera.

A second aspect of the invention provides a system for monitoring an area, the system comprising: a system for detecting motion of a camera monitoring the area; a system for estimating a physical area corresponding to a new field of view for the camera; a system for updating, using the physical area, at least one of: a status for a monitoring task of the camera or a location of an area for the monitoring task within an image captured by the camera; and a system for automatically performing, based on the updating, at least one of: adjusting a field of view of a second camera monitoring the area or updating a status for the monitoring task on the second camera.

A third aspect of the invention provides a computer program comprising program code stored on a computer-readable medium, which when executed, enables a computer system to implement a method of monitoring an area, the method comprising: detecting motion of a camera monitoring the area; estimating a physical area corresponding to a new field of view for the camera; updating, using the physical area, at least one of: a status for a monitoring task of the camera or a location of an area for the monitoring task within an image captured by the camera; and automatically performing, based on the updating, at least one of: adjusting a field of view of a second camera monitoring the area or updating a status for the monitoring task on the second camera.

A fourth aspect of the invention provides a method of generating a system for monitoring an area, the method comprising: providing a computer system operable to: detect motion of a camera monitoring the area; estimate a physical area corresponding to a new field of view for the camera; update, using the physical area, at least one of: a status for a monitoring task of the camera or a location of an area for the monitoring task within an image captured by the camera; and automatically perform, based on the updating, at least one of: adjusting a field of view of a second camera monitoring the area or updating a status for the monitoring task on the second camera.

A fifth aspect of the invention provides a method of monitoring an area, the method comprising: detecting motion of a camera monitoring the area; estimating a physical area corresponding to a new field of view for the camera, the estimating including: estimating the physical area using at least one of: a motion signal based estimation or an image based estimation; and estimating, when the at least one of: a motion signal based estimation or an image based estimation fails, the physical area based on a comparison of an image captured after the motion with a plurality of reference images, each reference image comprising a unique field of view previously captured by the camera; and updating, using the physical area, at least one of: a status for a monitoring task of the camera or a location of an area for the monitoring task within an image captured by the camera.

A sixth aspect of the invention provides a system for monitoring an area, the system comprising: a system for detecting motion of a camera monitoring the area; a system for estimating a physical area corresponding to a new field of view for the camera, the system for estimating including: a system for estimating the physical area using at least one of: a motion signal based estimation or an image based estimation; a system for comparing an image captured after the motion with a plurality of reference images, each reference image comprising a unique field of view previously captured by the camera, and estimating the physical area based on the comparing; and a system for updating, using the physical area, at least one of: a status for a monitoring task of the camera or a location of an area for the monitoring task within an image captured by the camera.

A seventh aspect of the invention provides a computer program comprising program code stored on a computer-readable medium, which when executed, enables a computer system to implement a method of monitoring an area, the method comprising: detecting motion of a camera monitoring the area; estimating a physical area corresponding to a new field of view for the camera, the estimating including: estimating the physical area using at least one of: a motion signal based estimation or an image based estimation; and estimating, when the at least one of: a motion signal based estimation or an image based estimation fails, the physical area based on a comparison of an image captured after the motion with a plurality of reference images, each reference image comprising a unique field of view previously captured by the camera; and updating, using the physical area, at least one of: a status for a monitoring task of the camera or a location of an area for the monitoring task within an image captured by the camera.

An eighth aspect of the invention provides a method of generating a system for monitoring an area, the method comprising: providing a computer system operable to: detect motion of a camera monitoring the area; estimate a physical area corresponding to a new field of view for the camera, the estimation including: estimate the physical area using at least one of: a motion signal based estimation or an image based estimation; and estimate, when the at least one of: a motion signal based estimation or an image based estimation fails, the physical area based on a comparison of an image captured after the motion with a plurality of reference images, each reference image comprising a unique field of view previously captured by the camera; and update, using the physical area, at least one of: a status for a monitoring task of the camera or a location of an area for the monitoring task within an image captured by the camera.

Additional aspects of the invention provide a method, system, program product, and method of using and generating each, which monitor a physical area for an alert, the monitoring comprising: obtaining an image captured by a camera; detecting motion of the camera; estimating an imaged physical area corresponding to a new field of view for the camera in response to the detected motion, the estimation of the imaged physical area using at least one of: a motion signal based estimation or an image based estimation; updating, using the imaged physical area, at least one of: a status for the alert or a location of the physical area for the alert within the image captured by the camera; monitoring the physical area for the alert within the image and triggering the alert upon detection of one of a plurality of events with respect to the physical area, the plurality of events including: the physical area being at least partially outside of the imaged physical area, an object moving across the physical area, or an object moving within the physical area; and presenting the alert to a user.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various aspects of the invention.

FIGS. 4A-B show an illustrative process flow for determining a new field of view according to an embodiment.

FIG. 5 shows an illustrative process flow for updating monitoring tasks for a camera according to an embodiment.

FIGS. 8A-C show an illustrative series of images acquired by a camera with three different fields of view according to an embodiment.

FIGS. 10A-C and 11A-C show illustrative series of images captured when two cameras are cooperatively utilized to perform a monitoring task according to an embodiment.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for monitoring an area while accounting for camera motion and/or monitoring tasks. For example, a physical area corresponding to a new field of view can be estimated for a camera for which motion is detected. The physical area can be estimated using a set of reference images previously captured by the camera, each of which comprises a unique field of view previously captured by the camera. Based on the physical area, a status for a monitoring task of the camera (e.g., an alert) can be updated and/or a location of an area for the monitoring task within an image captured by the camera can be updated. Further, based on the update(s), a field of view for a second camera can be automatically adjusted and/or a status for the monitoring task on the second camera can be automatically updated. In this manner, a solution is provided that can account for camera movement that may result in a change to the image used to perform a monitoring task and/or result in the monitoring task no longer being able to be performed by a camera. As used herein, unless otherwise noted, the term "set" means one or more (i.e., at least one) and the phrase "any solution" means any now known or later developed solution.

Figure 1:
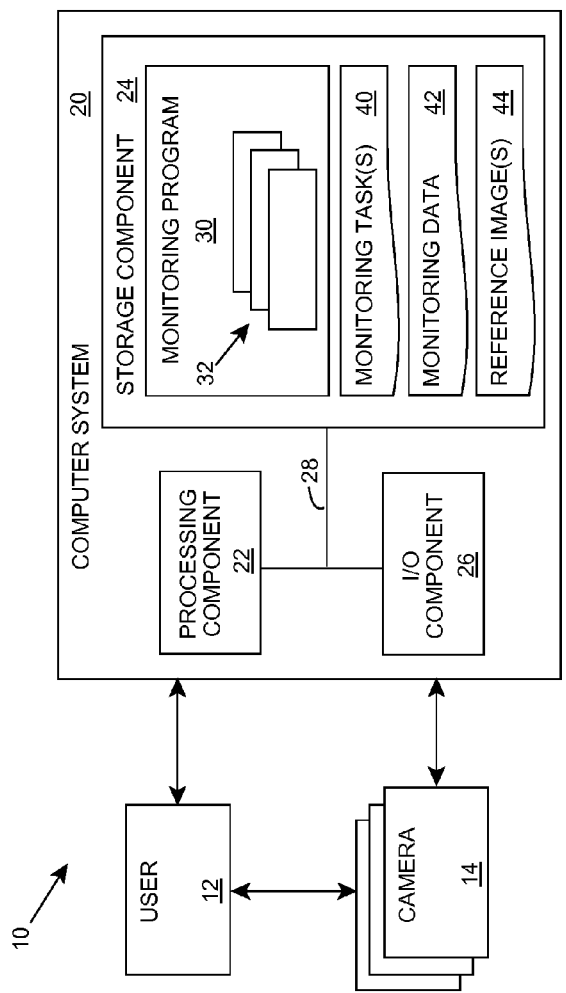
FIG. 1 shows an illustrative environment for monitoring an area according to an embodiment.

Turning to the drawings, FIG. 1 shows an illustrative environment 10 for monitoring an area according to an embodiment. To this extent, environment 10 includes a computer system 20 that can perform the process described herein in order to monitor the area. In particular, computer system 20 is shown including a monitoring program 30, which makes computer system 20 operable to monitor the area by performing the process described herein. It is understood that the monitored area can comprise a single continuous physical location or multiple physical locations, at least some of which may be physically disjointed from the other physical locations.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as monitoring program 30, which is at least partially stored in storage component 24. While executing program code, processing component 22 can read and/or write data to/from storage component 24 and/or I/O component 26. Pathway 28 provides a communications link between each of the components in computer system 20. I/O component 26 can comprise one or more human I/O devices, which enable a human user 12 to interact with computer system 20 and/or one or more communications devices to enable another computer system, such as user 12 and/or camera 14, to communicate with computer system 20 using any type of communications link.

In any event, computer system 20 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, monitoring program 30 can be embodied as any combination of system software and/or application software. Further, monitoring program 30 can be implemented using a set of modules 32. In this case, a module can comprise a component that performs a set of actions used by monitoring program 30. Further, it is understood that some of the actions discussed herein may not be implemented or additional actions may be implemented by computer system 20.

When computer system 20 comprises multiple computing devices, each computing device can have only a portion of monitoring program 30 installed thereon (e.g., one or more modules 32). However, it is understood that computer system 20 and monitoring program 30 are only representative of various possible equivalent computer systems that may implement the process described herein. To this extent, in other embodiments, the actions implemented by computer system 20 and monitoring program 30 can be at least partially implemented by one or more computing devices that include any combination of general and/or specific purpose hardware and/or program code. In each embodiment, the program code and hardware can be created using standard programming and engineering techniques, respectively.

Regardless, when computer system 20 includes multiple computing devices, the computing devices can communicate over any type of communications link. Further, while performing the process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

Figure 2:
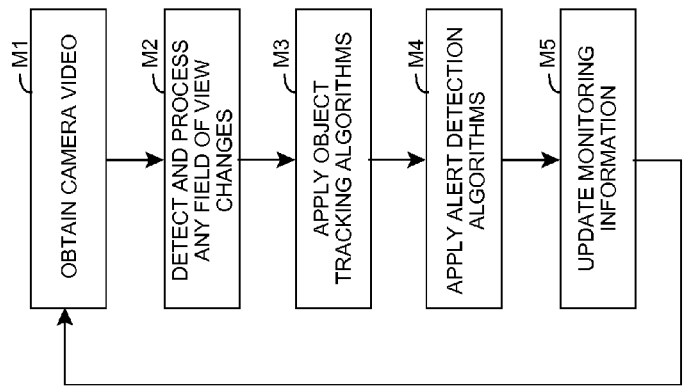
FIG. 2 shows an illustrative high level process flow for monitoring the area according to an embodiment.

As discussed herein, monitoring program 30 enables computer system 20 to monitor an area using a plurality of cameras 14. To this extent, FIG. 2 shows an illustrative high level process flow for monitoring the area according to an embodiment, which can be implemented by computer system 20 (FIG. 1). Referring to FIGS. 1 and 2, in process M1, computer system 20 can obtain camera video from cameras 14 using any solution. It is understood that the term "video" includes any series of images periodically captured by a single camera 14. To this extent, the camera can capture multiple images every second, an image every few seconds, and/or the like. Computer system 20 can render the images from one or more of the cameras 14 on a monitor for viewing by user 12. Further, user 12 can selectively move one or more of the cameras 14 using computer system 20 and/or an interface device for the camera(s) 14.

As discussed further herein, in process M2, computer system 20 can detect and process any field of view changes that may have occurred for a camera 14. In particular, computer system 20 can perform one or more monitoring tasks 40, which can be stored and managed by computer system 20 using any solution. Each monitoring task 40 can define a set of action(s) to be performed by computer system 20 on the video obtained from camera(s) 14. Monitoring tasks 40 can be scheduled to be applied only during certain times of the day/week and/or dependent on other conditions (e.g., weather, security threat level, and/or the like). Further, each monitoring task 40 may correspond to a physical area, which may or may not be visible dependent on the field of view of a camera 14.

For example, in process M3, computer system 20 can apply a set of object tracking algorithms to the video. The object tracking algorithms can track the motion of objects (e.g., automobile, people, and/or the like) through a physical area within a field of view of a camera, from one camera to another, and/or the like. To this extent, the object tracking algorithms can implemented by computer system 20 in order to make spatially-referenced observations in order to perform various monitoring tasks 40 that relate to physical locations, such as counting objects, identifying actions of objects, tracking speeds of objects, and/or the like.

Additionally, the monitoring tasks 40 may include generating alerts upon the detection of a predefined event for a physical location. In process M4, computer system 20 can apply alert detection algorithms to determine whether an alert is present based on the corresponding monitoring task(s) 40. For example, a monitoring task 40 can define an alert when a threshold number of objects is exceeded within a physical area, when an object is present within a physical area for an extended period, and/or the like. Further, a monitoring task 40 can define more complex alerts, e.g., based on action(s) of an object (e.g., throwing a punch, leaving a bag, running away from location, and/or the like) using any solution.

An alert detection algorithm also can define an alert using an electronic "tripwire". Similarly, an alert detection algorithm can generate an alert based on movement in a restricted portion of the monitored area. To this extent, FIG. 7A shows an illustrative image 50 having a tripwire 52 defined therein. In either case, computer system 20 can enable user 12 to manage a monitoring task 40 that defines a physical area, such as a tripwire 52 and/or the restricted area using any solution. In particular, user 12 can indicate the physical area on an image, and computer system 20 can record the corresponding image coordinates for the physical area in monitoring task 40. The physical area(s) marked in one camera view may be drawn by hand on an image of that view, or may be derived from a marked physical area in another view or a ground plan (for instance by mapping the coordinates using homography) or from a 3D model, using calibration information. Subsequently, when an object moves with respect to the physical area, e.g., across tripwire 52 and/or into the restricted area, computer system 20 can generate an alert, which computer system 20 can present to user 12 using any solution (e.g., audible sound, visual message, and/or the like).

In process M5, computer system 20 can update monitoring data 42, such as image(s) from cameras 14, tracking information for one or more objects, the field of view for each camera 14, any manual, automatic and/or inadvertent camera 14 movement that may have occurred, any alert(s) detected/present, and/or the like. Computer system 20 can utilize monitoring data 42 to process newly received images, can store monitoring data 42 for historical purposes, and/or the like. In any event, the process returns to process M1 while the monitoring is performed.

Figure 3:
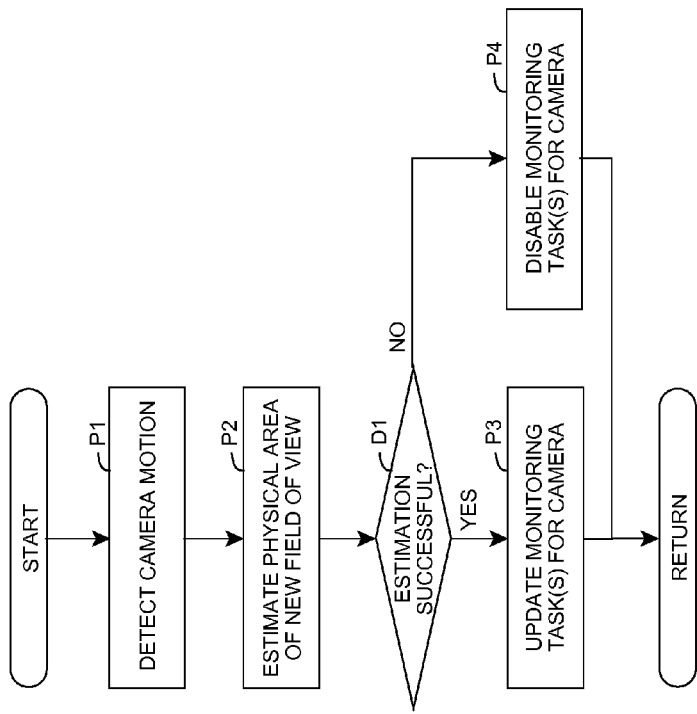
FIG. 3 shows an illustrative process flow for processing a field of view change according to an embodiment.

As previously mentioned, in process M2, computer system 20 can detect and process any field of view changes that may have occurred for a camera 14. To this extent, FIG. 3 shows an illustrative process flow for processing a field of view change according to an embodiment, which can be implemented by computer system 20 (FIG. 1). Referring to FIGS. 1 and 3, in process P1, computer system 20 detects camera motion using any solution. In an embodiment, computer system 20 can receive camera motion signals (e.g., pan, tilt, zoom) indicating that camera 14 is being moved. In another embodiment, computer system 20 can compare a new image captured by camera 14 with an image previously captured to determine if there is any difference in the field of view. Further, camera 14 can include one or more sensors, which detect the position of camera 14 and transmit the position to computer system 20. In the latter two cases, non-purposeful movement of camera 14 (e.g., due to wind or other force) can be detected.

Figure 4A:
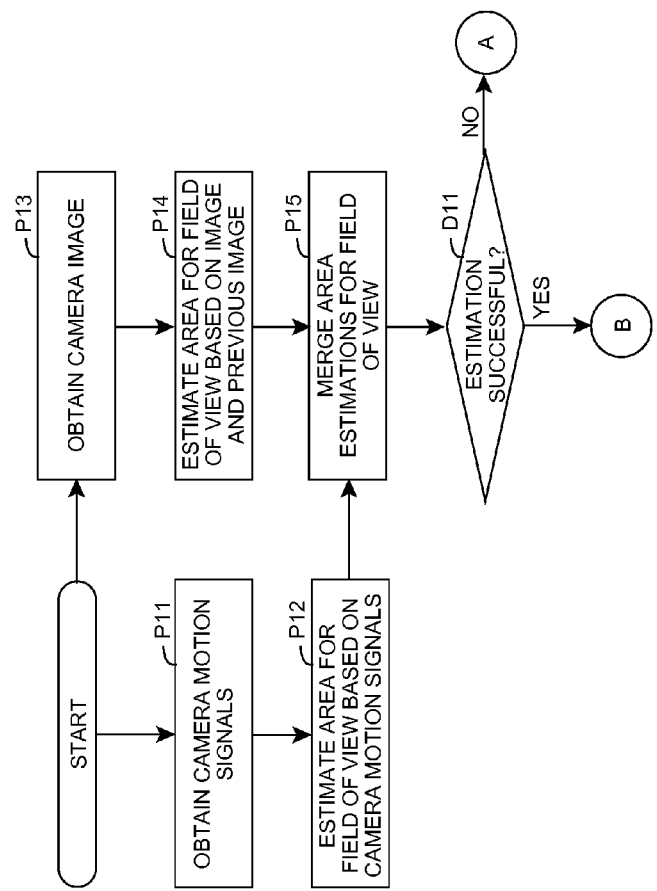

In process P2, computer system 20 attempts to estimate the physical area that corresponds to the new field of view of camera 14. To this extent, FIGS. 4A-B show an illustrative process flow for estimating a physical area that corresponds to a new field of view according to an embodiment, which can be implemented by computer system 20 (FIG. 1). Referring to FIGS. 1 and 4A, the process flow performs two estimations, which can be used together to provide a more accurate estimate and confirmation of the estimate for the field of view. A first estimate is based on camera motion signals. In process P11, computer system 20 obtains camera motion signals from, for example, camera 14, an I/O device for moving camera 14 (e.g., a joystick), and/or the like. In process P12, computer system 20 estimates the physical area corresponding to the new field of view based on the camera motion signals using any solution. In particular, each motion signal (e.g., left/right, up/down, zoom in/zoom out, etc.) can be correlated with a resulting change to the physical area within the field of view. Computer system 20 can adjust the area corresponding to the field of view based on the motion signal(s) and the correlated change(s) to the area.

A second estimate is based on image processing. In this case, in process P13, computer system 20 can obtain an image newly acquired by camera 14. In process P14, computer system 20 can estimate a physical area corresponding to the new field of view based on the newly acquired image and a previous image. For example, computer system 20 can identify one or more background features within the field of view of camera 14 and determine a difference, if any, between the locations of the background feature(s) in the new image and the previous image. In an embodiment, computer system 20 can process successive images acquired by camera 14 so that the motion is tracked frame by frame.

In process P15, computer system 20 merges the two estimations of the physical area to generate a final estimation of the physical area for the field of view. In particular, the motion signal-based estimation can be refined by the image-based estimation or vice versa, depending on the corresponding accuracies of each estimation. Further, the estimations can be compared to ensure that they are within reasonable agreement. In this case, the one estimation (e.g., image-based estimation) may provide a check for a primary estimation (e.g., the motion signal-based estimation). However, either estimate, and the merger thereof, may fail for various reasons. For example, the camera motion signals may indicate that the camera 14 moved to an extent that is not possible. In this case, the camera motion signals may be indicative of bad data being received by computer system 20. Further, the new image may not have any background features visible (e.g., due to a bird flying in front of camera 14) thereby making an image-based determination not possible.

In any event, in decision D11, computer system 20 determines whether the estimation was successful. The estimation can be successful when the alternative estimations are sufficiently close (e.g., within an expected margin of error) to be merged. Further, computer system 20 can determine that the estimation was successful when one estimation failed. In this case, computer system can rely exclusively on the second estimation. However, when one estimation fails for a sufficient number of consecutive images captured by camera 14, computer system 20 can generate an alert since it may indicate a problem that is not merely transient. Alternatively, computer system 20 can indicate that the estimation failed when either estimation failed. Further, computer system 20 can implement only a single estimation (e.g., motion signal-based estimation), which may be sufficiently accurate. In this case, the merge in process P15 will not be required, and in decision D11, computer system 20 can determine if the single estimation was successful.

When the estimation was not successful, the process flow can continue to process P16 of FIG. 4B. Referring to FIGS. 1 and 4B, in process P16, computer system 20 can search for one or more reference images 44 that match the captured image. To this extent, a set of reference images 44 can include various illustrative images previously captured by camera 14. Each reference image 44 can comprise an image that was captured when camera 14 had a known corresponding physical area for its field of view, e.g., when a monitoring task 40 was set up on camera 14. Each reference image 44 can have a unique field of view from every other reference image 44.

As illustrated, computer system 20 can utilize the set of reference images 44 when the field of view cannot be reliably determined using another solution. It is understood that computer system 20 could utilize the set of reference images 44 periodically, each time a new field of view needs to be determined, and/or the like. To this extent, computer system 20 can utilize the set of reference images 44 when incremental tracking of the field of view fails, camera 14 is turned off/on, and/or the like. In any event, in decision D12, computer system 20 can determine if the new image matches any of the reference images 44. In this case, a "match" would not necessarily comprise identical fields of view, but would comprise images having a sufficient number of detected features that can be used to reliably determine a physical area corresponding to a field of view of the new image based on the known physical area for the field of view of the reference image 44. When multiple reference images 44 match the image, a best match can be selected and/or all or some of the reference images 44 can be selected (e.g., reference images 44 to left and right of new image). When at least one reference image 44 is selected, in process P17, computer system 20 estimates the area of the field of view of the new image based on the field(s) of view of the reference image(s) 44 and its (their) corresponding area (s). If no reference image 44 is selected, then a failure can be returned.

When computer system 20 determines in decision D11 (FIG. 4A) that the area was successfully estimated and/or the area is estimated using reference image(s) 44 in process P17, computer system 20 can determine in decision D13 whether the image comprises a field of view that is unique from the fields of view of the images in the set of reference images 44. For example, computer system 20 can compare the field of view of the new image with the fields of view of the set of reference images 44. If the field of view of the new image is sufficiently different from the fields of view of each reference image 44 (e.g., a difference in the physical area exceeds a threshold amount), then in process P18, computer system 20 can add the image (and the corresponding field of view) to the set of reference images 44. For example, the new image could comprise a field of view that is further left/right than any of the current reference images 44. In this case, the new image can be added to the set of reference images 44. Further, the new image may make one or more existing reference images 44 redundant. In this case, the redundant reference image(s) 44 can be removed from the set of reference images 44. In any event, a success can be returned to the process flow for processing a field of view change.

Returning to FIGS. 1 and 3, in decision D1, computer system 20 determines whether the new area for the field of view was successfully estimated. If not, in process P4, computer system 20 can disable all of the monitoring task(s) 40 for camera 14. In this case, computer system 20 also can generate an alert indicating that camera 14 is not available for performing monitoring tasks 40, thereby enabling user 12 to evaluate the operating condition of camera 14.

When the area for the new field of view is successfully determined, computer system 20 can update the monitoring task(s) 40 for camera 14 based on the new area in process P3. To this extent, FIG. 5 shows an illustrative process flow for updating monitoring tasks 40 for camera 14 (FIG. 1) according to an embodiment, which can be implemented by computer system 20 (FIG. 1). Referring to FIGS. 1 and 5, in decision D21, computer system 20 can determine whether another monitoring task 40 for camera 14 requires processing. If so, then in process P21, computer system 20 can select the next monitoring task 40 for camera 14 for processing. Otherwise, the process flow is complete.

In process P22, computer system 20 can re-project the monitoring task 40 in the area corresponding to the new field of view for camera 14. In particular, based on the adjustments made between the current area and the previous area, the location (e.g., image coordinates) of an area (e.g., tripwire, restricted area, and/or the like) for the monitoring task 40 within an image captured by camera 14 is updated. Similarly, the location of any object(s) being tracked for the monitoring task 40 can be updated. The update results in new image coordinates that substantially correspond to the physical location(s) that is (are) relevant for the monitoring task 40.

Figure 7B:
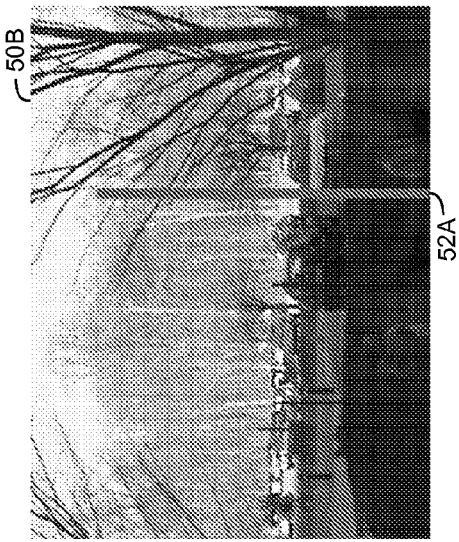
FIGS. 7A-C show an illustrative pair of images acquired by a camera with two different fields of view according to an embodiment.
Figure 7C:
Figure 7A:
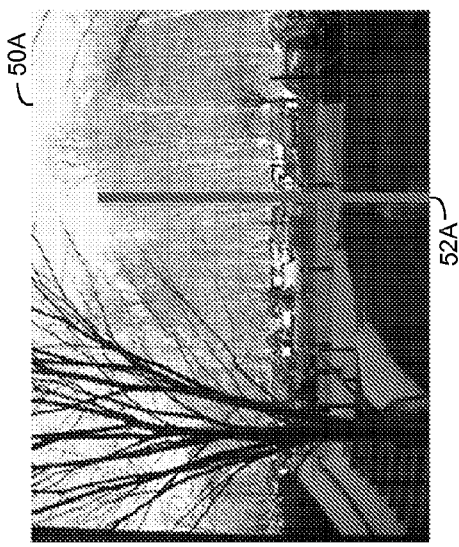

For example, FIGS. 7A-C show an illustrative pair of images 50A-B acquired by a camera 14 with two different fields of view according to an embodiment. In FIG. 7A, image 50A includes a tripwire 52A for a monitoring task 40. As illustrated, tripwire 52A corresponds to a physical location between a pair of trees in the foreground. In FIG. 7B, image 50B has a different field of view than that of image 50A. In particular, the field of view has been moved to the right by about half of the image. To this extent, tripwire 52A, which remains in the same location of image 50B as in image 50A, now corresponds to a different physical location. In this case, computer system 20 can re-project tripwire 52A based on the difference between the two fields of view. FIG. 7C shows image 50A and tripwire 52B after re-projection, wherein tripwire 52B corresponds to substantially the same physical location as tripwire 52A in image 50A. A similar re-projection can be performed for an object being tracked, in which the expected or immediately preceding physical location is re-projected. In this manner, the change in the field of view of camera 14 will not falsely indicate an increase/decrease in the speed that a tracked object is moving.

However, the physical location may no longer be visible or be only partially visible within the area corresponding to the new field of view. In this case, the adjustment may result in one or more image coordinates that are outside of the imaged area. For example, FIGS. 8A-C show an illustrative series of images 56A-C acquired by a camera 14 with three different fields of view according to an embodiment. In FIG. 8A, image 56A is shown including a tripwire 58A. Subsequently, camera 14 can be moved such that image 56B of FIG. 8B is captured. In this case, adjusting the image coordinates for tripwire 58A results in coordinates that are not within image 56B. In FIG. 8C, image 56C can be captured by camera 14 after it is again moved. In this case, tripwire 56B is again within the field of view, in a location different from that of tripwire 56A in image 56A.

Returning to FIGS. 1 and 5, in decision D22, computer system 20 determines whether the relevant physical area(s) (e.g., a tripwire, region, and/or the like) for the monitoring task 40 remain(s) visible in the field of view of camera 14. To this extent, depending on the monitoring task 40, the physical area(s) may need to be entirely within the field of view, have a minimum percentage within the field of view, have a particular subset of the physical area within the field of view, and/or the like, in order for computer system 20 to determine that it is visible. If the area is visible, computer system 20 enables the monitoring task 40 for camera 14 in process P24, if necessary. Otherwise, in process P23, computer system 20 disables the monitoring task 40 for camera 14, if necessary. In either case, the process flow can continue processing another task, if necessary.

As discussed herein, computer system 20 can continually process video obtained from one or more cameras 14. In particular, computer system 20 can adjust for any field of view changes, enable/disable monitoring task(s) 40, apply object tracking and/or alert detection algorithms, and/or the like. Additionally, when multiple cameras 14 are utilized to monitor an area, computer system 20 can cooperatively utilize the cameras 14 to ensure that important monitoring tasks 40 are being performed by at least one camera 14.

Figure 6:
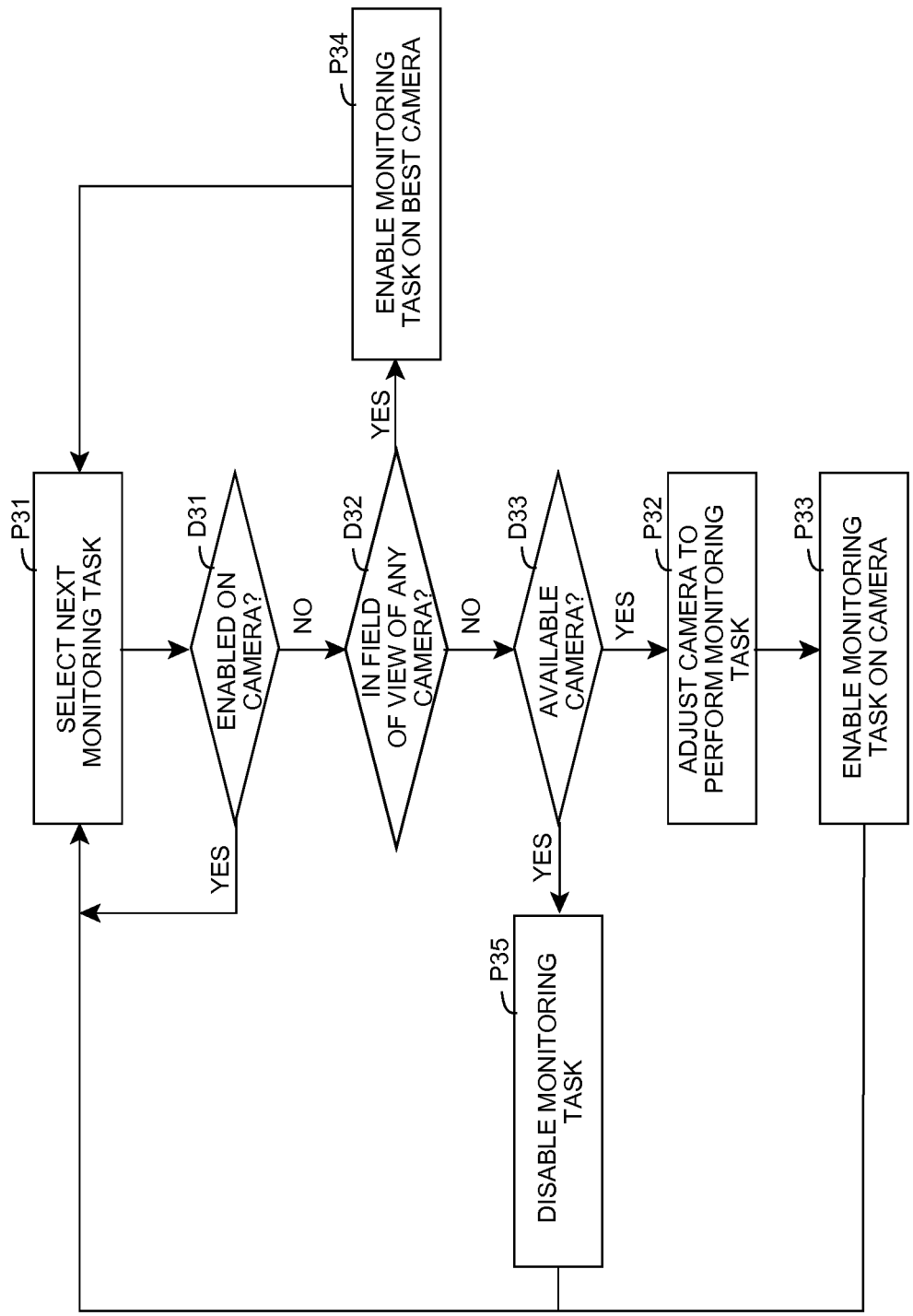
FIG. 6 shows an illustrative process flow for managing monitoring tasks according to an embodiment.

To this extent, FIG. 6 shows an illustrative process flow for managing monitoring tasks 40 according to an embodiment, which can be implemented by computer system 20 (FIG. 1). Computer system 20 can execute the process flow concurrently with the monitoring process flow of FIG. 2. In an embodiment, the actions of the monitoring task management process flow can be performed periodically (e.g., once a minute), on demand (e.g., when a monitoring task 40 is disabled), and/or the like. In any event, referring to FIGS. 1 and 6, in process P31, computer system 20 can select the next monitoring task 40. For example, computer system 20 can sequentially process the monitoring tasks 40 based on their corresponding priorities.

Figure 9:
FIG. 9 shows an illustrative data structure according to an embodiment.

In decision D31, computer system 20 determines whether the monitoring task 40 is enabled on a camera. If so, the monitoring task 40 does not require further processing. When further processing is required, computer system 20 can utilize a data structure that stores information on the relationships between monitoring tasks 40 and cameras 14. For example, FIG. 9 shows an illustrative data structure 60 according to an embodiment. Data structure 60 includes a unique entry for each monitoring task 40 and camera 14 capable of performing the monitoring task 40. To this extent, data structure 60 is shown including two entries for TASK A, one for CAMERA X and one for CAMERA Z. This means that TASK A can be performed by CAMERA X and/or CAMERA Z. Further, data structure 60 can include a priority for each task and a priority for each camera for performing the task. In the illustrative data structure 60, TASK A has a higher priority than TASK B, which in turn has a higher priority than TASK C. Additionally, CAMERA X has a higher priority than CAMERA Z for performing TASK A. Still further, each entry in data structure 60 includes a field of view, which comprises a preferred field of view for camera 14 to perform the corresponding monitoring task 40.

In any event, referring to FIGS. 1, 6, and 9, in decision D32, computer system 20 can determine if the area(s) for the monitoring task 40 is/are in the field of view of one or more cameras 14. For example, computer system 20 can utilize data structure 60 to determine each camera 14 that is capable of performing monitoring task 40. Computer system 20 can analyze each such camera 14 in the order of their priorities until one is found having the monitoring task 40 within its field of view or all of the possible cameras 14 have been analyzed.

When the area(s) for monitoring task 40 is (are) within the field of view of a camera 14, in process P34, computer system 20 can enable the monitoring task 40 for the camera 14. Otherwise, in decision D33, computer system 20 can determine if a camera 14 is available. For example, a camera 14 may be available if it is capable of performing the monitoring task 40 and is not currently being used to perform any monitoring task 40, is being used to perform a lower priority monitoring task 40, and/or the like. To this extent, computer system 20 can use data structure 60 to determine whether any of the possible cameras 14 are available. When a camera 14 is manually moved, computer system 20 can determine whether the camera 14 is available using any solution. For example, if the video of the moved camera 14 is no longer displayed on monitor of the user 12 who moved the camera 14 and/or is not being used for any other monitoring task, it may be assumed to be available. Additionally, computer system 20 can prompt user 12 as to whether the camera 14 is continuing to be utilized.

In any event, if a camera 14 is not available, computer system 20 can disable the monitoring task 40 in process P35. In this case, computer system 20 can generate an alert indicating that the monitoring task 40 is not being performed. Otherwise, in process P32, computer system 20 can automatically adjust a field of view of an available camera 14 to perform the monitoring task 40. In particular, computer system 20 can move the available camera 14 so that the area(s) of monitoring task 40 are within the field of view, e.g., so that camera 14 has the preferred field of view denoted in data structure 60. In process P33, computer system 20 can enable the monitoring task 40 on the camera 14.

It is understood that the process flow of FIG. 6 is only illustrative. For example, a monitoring task may be always enabled when its area(s) is (are) within the field of view for a camera 14, in which case decision D32 and process P34 would be redundant. However, a monitoring task may be performed by a single camera 14 at a time, e.g., to reduce the possibility of multiple alerts being generated for the same event. Further, computer system 20 can always try to enable a monitoring task 40 on the camera 14 having the highest priority, rather than merely ensuring that the monitoring task 40 is enabled on at least one camera as in decision D31. In this case, as part of enabling the monitoring task 40 on camera 14, computer system 20 can disable the monitoring task 40 on any lower priority camera 14 that may have been performing the monitoring task 40. In this manner, the lower priority camera 14 can be freed up to perform another monitoring task 40. Similarly, data structure 60 is only illustrative of various data structures that may include additional data, not include some data, and/or may store such data using an alternative solution.

Figure 11C:
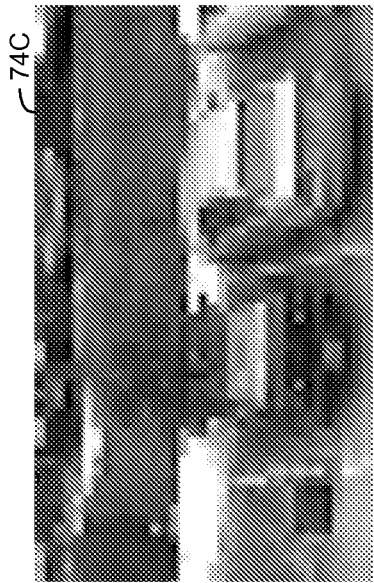
Figure 10C:
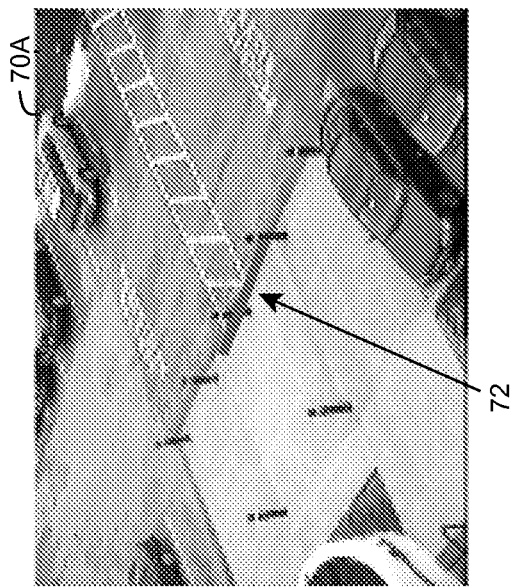

FIGS. 10A-C and 11A-C show illustrative series of images captured when two cameras 14 are cooperatively utilized to perform a monitoring task 40 according to an embodiment. In FIG. 10A, image 70A is captured by a first camera 14 that is performing a monitoring task 40 that includes a tripwire 72. In FIG. 11A, a second camera 14 can capture an image 74A that includes a tripwire 76A that corresponds to the same monitoring task 40. In FIG. 10B, the first camera 14 is moved so that tripwire 72 (FIG. 10A) is no longer in the image 70B capture by the first camera 14. In FIG. 11B, the second camera 14 is moved to a preferred field of view for capturing images 74B with tripwire 76B in order to perform monitoring task 40. In FIG. 11C, the second camera 14 is moved so that tripwire 76B is no longer within image 74C. As a result, in FIG. 10C, the first camera 14 is moved to a preferred position such that the field of view can again capture image 70A with tripwire 72 in order to perform the monitoring task 40.

It is understood that each of the process flows shown and described herein is only illustrative. To this extent, numerous variations of these process flows are possible, and are included within the scope of the invention. Illustrative variations include performing one or more processes in parallel and/or a different order, performing additional processes, not performing some processes, and/or the like. To this extent, computer system 20 and/or monitoring program 30 can utilize multiple tasks/threads/processes to perform the actions of the processes described herein.

While shown and described herein as a method and system for monitoring an area, it is understood that aspects of the invention further provide various alternative embodiments. For example, in one embodiment, the invention provides a computer program stored on at least one computer-readable medium, which when executed, enables a computer system to monitor an area. To this extent, the computer-readable medium includes program code, such as monitoring program 30 (FIG. 1), which implements some or all of the process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; a modulated data signal having one or more of its characteristics set and/or changed in such a manner as to encode information in the signal; paper; and/or the like.

In another embodiment, the invention provides a method of generating a system for monitoring an area. In this case, a computer system, such as computer system 20 (FIG. 1), can be obtained (e.g., created, maintained, made available, etc.) and one or more programs/systems for performing the process described herein can be obtained (e.g., created, purchased, used, modified, etc.) and deployed to the computer system. To this extent, the deployment can comprise one or more of: (1) installing program code on a computing device from a computer-readable medium; (2) adding one or more computing devices to the computer system; and (3) incorporating and/or modifying the computer system to enable it to perform the process described herein.

It is understood that aspects of the invention can be implemented as part of a business method that performs the process described herein on a subscription, advertising, and/or fee basis. That is, a service provider could offer to monitor an area as described herein. In this case, the service provider can manage (e.g., create, maintain, support, etc.) some or all of environment 10 (FIG. 1), such as computer system 20 (FIG. 1), that performs the process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of monitoring an area, the method comprising:
   detecting motion of a camera monitoring the area; and
   automatically reconfiguring a plurality of cameras monitoring the area in response to the detected motion of the camera, the automatically reconfiguring including:
   estimating a physical area corresponding to a new field of view for the camera in response to the motion detecting, the estimating of the physical area including using a combination of: a motion signal based estimation and an image based estimation using a recent image captured before the motion, wherein the estimating further includes:
   in response to a failure of the at least one of: the motion signal based estimation or the image based estimation, comparing an image captured by the camera after the motion with a plurality of stored reference images, each reference image having a corresponding known unique field of view previously captured by the camera;
   updating, using the physical area, at least one of: a status for performing a monitoring task using the camera or a location of an area for the monitoring task within an image captured by the camera, wherein the monitoring task corresponds to a fixed physical location within the monitored area and generates an alert in response to detecting a predefined event corresponding to the fixed physical location; and
   automatically performing, based on the updating, at least one of: adjusting a field of view of a second camera monitoring the area or updating a status for performing the monitoring task using the second camera.

2. The method of claim 1, wherein the estimating includes:
   obtaining a set of camera motion signals for the camera; and
   estimating the physical area based on the set of camera motion signals.

3. The method of claim 1, further comprising adding the image captured by the camera after the motion to the plurality of reference images for use in the estimating.

4. The method of claim 1, the updating including determining that the camera cannot perform the monitoring task effectively as a result of the detected motion, and the automatically performing including identifying the second camera based on at least one of: a current field of view of the second camera with respect to the fixed physical location, a possible field of view of the second camera with respect to the fixed physical location, a relative priority of the second camera for performing the monitoring task, or relative priorities of the monitoring task and any monitoring tasks being performed by the second camera.

5. The method of claim 4, wherein the updating includes adjusting the field of view of the second camera to perform the monitoring task when the monitoring task is a higher priority than any monitoring tasks being performed by the second camera.

6. A system comprising:
   a computer system for monitoring an area by performing a method comprising:
   detecting motion of a camera monitoring the area; and
   automatically reconfiguring a plurality of cameras monitoring the area in response to the detected motion of the camera, the automatically reconfiguring including:
   estimating a physical area corresponding to a new field of view for the camera in response to the motion detecting, the estimating of the physical area including using a combination of: a motion signal based estimation and an image based estimation using a recent image captured before the motion, wherein the estimating further includes:
   in response to a failure of the at least one of: the motion signal based estimation or the image based estimation, using a comparison of an image captured after the motion with a plurality of stored reference images, each reference image having a corresponding known unique field of view previously captured by the camera;
   updating, using the physical area, at least one of: a status for performing a monitoring task using the camera or a location of an area for the monitoring task within an image captured by the camera, wherein the monitoring task corresponds to a fixed physical location within the monitored area and generates an alert in response to detecting a predefined event corresponding to the fixed physical location; and
   automatically performing, based on the updating, at least one of: adjusting a field of view of a second camera monitoring the area or updating a status for performing the monitoring task using the second camera.

7. The system of claim 6, wherein the estimating includes:
   obtaining a set of camera motion signals for the camera; and
   estimating the physical area based on the set of camera motion signals.

8. The system of claim 6, further comprising adding the image captured by the camera after the motion to the plurality of reference images.

9. The system of claim 6, the updating including determining that the camera cannot perform the monitoring task effectively as a result of the detected motion, and the automatically performing including identifying the second camera based on at least one of: a current field of view of the second camera with respect to the fixed physical location, a possible field of view of the second camera with respect to the fixed physical location, a relative priority of the second camera for performing the monitoring task, or relative priorities of the monitoring task and any monitoring tasks being performed by the second camera.

10. The system of claim 9, wherein the updating includes adjusting the field of view of the second camera to perform the monitoring task when the monitoring task is a higher priority than any monitoring tasks being performed by the second camera.

11. A computer program comprising program code stored on a computer-readable device, which when executed, enables a computer system to implement a method of monitoring an area, the method comprising:
   detecting motion of a camera monitoring the area; and
   automatically reconfiguring a plurality of cameras monitoring the area in response to the detected motion of the camera, the automatically reconfiguring including:
      estimating a physical area corresponding to a new field of view for the camera in response to the motion detecting, the estimating of the physical area including using a combination of: a motion signal based estimation and an image based estimation using a recent image captured before the motion,
      wherein the estimating further includes: in response to a failure of the at least one of: the motion signal based estimation or the image based estimation, using a comparison of an image captured after the motion with a plurality of stored reference images, each reference image having a corresponding known unique field of view previously captured by the camera;
      updating, using the physical area, at least one of: a status for performing a monitoring task using the camera or a location of an area for the monitoring task within an image captured by the camera, wherein the monitoring task corresponds to a fixed physical location within the monitored area and generates an alert in response to detecting a predefined event corresponding to the fixed physical location; and
      automatically performing, based on the updating, at least one of: adjusting a field of view of a second camera monitoring the area or updating a status for performing the monitoring task using the second camera.

12. The computer program of claim 11, wherein the estimating includes:
   obtaining a set of camera motion signals for the camera; and
   estimating the physical area based on the set of camera motion signals.

13. The computer program of claim 1, further comprising adding the image captured by the camera after the motion to the plurality of reference images.

14. The computer program of claim 11, the updating including determining that the camera cannot perform the monitoring task effectively as a result of the detected motion, and the automatically performing including identifying the second camera based on at least one of: a current field of view of the second camera with respect to the fixed physical location, a possible field of view of the second camera with respect to the fixed physical location, a relative priority of the second camera for performing the monitoring task, or relative priorities of the monitoring task and any monitoring tasks being performed by the second camera.

15. The computer program of claim 14, wherein the updating includes adjusting the field of view of the second camera to perform the monitoring task when the monitoring task is a higher priority than any monitoring tasks being performed by the second camera.

16. A method of generating a system for monitoring an area, the method comprising:
   providing a computer system configured to:
   detect motion of a camera monitoring the area; and
   automatically reconfigure a plurality of cameras monitoring the area in response to the detected motion of the camera, the automatically reconfiguring including:
      estimate a physical area corresponding to a new field of view for the camera in response to the motion detecting, the estimating of the physical area including using a combination of: a motion signal based estimation and an image based estimation using a recent image captured before the motion, wherein the estimating further includes:
      in response to a failure of the at least one of: the motion signal based estimation or the image based estimation, using a comparison of an image captured after the motion with a plurality of stored reference images, each reference image having a corresponding known unique field of view previously captured by the camera;
      update, using the physical area, at least one of: a status for performing a monitoring task using the camera or a location of an area for the monitoring task within an image captured by the camera, wherein the monitoring task corresponds to a fixed physical location within the monitored area and generates an alert in response to detecting a predefined event corresponding to the fixed physical location; and
      automatically perform, based on the updating, at least one of: adjusting a field of view of a second camera monitoring the area or updating a status for performing the monitoring task using the second camera.

17. A system comprising:
   a computer system for monitoring an area by performing a method comprising:
   detecting motion of a camera monitoring the area;
   estimating a physical area corresponding to a new field of view for the camera in response to the detecting, the estimating including:
      estimating the physical area using a combination of: a motion signal based estimation and an image based estimation using a recent image captured before the motion; and
      in response to failure of the estimating the physical area using the combination, comparing an image captured after the motion with a plurality of stored reference images, each reference image having a corresponding known unique field of view previously captured by the camera, and estimating the physical area based on the comparing; and
   updating, using the physical area, at least one of: a status for performing a monitoring task using the camera or a location of an area for the monitoring task within an image captured by the camera, wherein the monitoring task corresponds to a fixed physical location within the monitored area and generates an alert in response to detecting a predefined event corresponding to the fixed physical location, wherein the updating includes:
   determining that the camera cannot perform the monitoring task effectively as a result of the detected motion, and the automatically performing including identifying the second camera based on at least one of: a current field of view of the second camera with respect to the fixed physical location, a possible field of view of the second camera with respect to the fixed physical location, a relative priority of the second camera for performing the monitoring task, or relative priorities of the monitoring task and any monitoring tasks being performed by the second camera, and adjusting the field of view of the second camera to perform the monitoring task when the monitoring task is a higher priority than any monitoring tasks being performed by the second camera.

18. The system of claim 17, wherein the motion signal based estimation includes obtaining a set of camera motion signals for the camera, and estimating the physical area based on the set of camera motion signals.

19. The system of claim 17, wherein the image based estimation includes comparing the image captured by the camera after the motion with a recent image captured before the motion, and estimating the physical area based on the comparing.

20. The system of claim 17, wherein the plurality of reference images are used to determine the physical area when the at least one of the motion signal based estimation or the image based estimation of the physical area failed.

21. The system of claim 17, further comprising:
determining that the image captured after the motion comprises a unique field of view from the fields of view of the plurality of reference images; and
adding the image captured after the motion to the plurality of reference images.

22. The system of claim 17, further comprising automatically performing, based on the updating, at least one of: adjusting a field of view of a second camera monitoring the area or updating a status for performing the monitoring task using the second camera.

23. A system comprising:
a computer system for monitoring a physical area for an alert by performing a method comprising:
obtaining an image captured by a camera;
detecting motion of the camera;
estimating an imaged physical area corresponding to a new field of view for the camera in response to the detected motion, the estimation of the imaged physical area using a combination of: a motion signal based estimation and an image based estimation using a recent image captured before the motion;
updating, using the imaged physical area, at least one of: a monitoring status for the alert or a location of the physical area for the alert within the image captured by the camera, wherein the updating includes:
determining that the camera cannot perform the monitoring task effectively as a result of the detected motion, and the automatically performing including identifying the second camera based on at least one of: a current field of view of the second camera with respect to the fixed physical location, a possible field of view of the second camera with respect to the fixed physical location, a relative priority of the second camera for performing the monitoring task, or relative priorities of the monitoring task and any monitoring tasks being performed by the second camera, and
adjusting the field of view of the second camera to perform the monitoring task when the monitoring task is a higher priority than any monitoring tasks being performed by the second camera;
monitoring the physical area for the alert within the image and triggering the alert upon detection of one of a plurality of events with respect to the physical area, the plurality of events including: the physical area being at least partially outside of the imaged physical area and at least one of: an object moving across the physical area or an object moving within the physical area; and
presenting the alert to a user.

24. The system of claim 23, the estimation of the portion of the physical area further including, in response to failure of the estimating the physical area using the combination, using a comparison of an image captured after the motion with a plurality of stored reference images, each reference image having a corresponding known unique field of view previously captured by the camera, in response to a failure of the at least one of: the motion signal based estimation or the image based estimation.

25. The system of claim 23, further comprising automatically performing, based on the updating, at least one of: adjusting a field of view of a second camera capable of monitoring the physical area for the alert or updating a monitoring status for the alert on the second camera.

* * * * *